United States Patent [19]

Trull

[11] Patent Number: 5,497,477
[45] Date of Patent: Mar. 5, 1996

[54] SYSTEM AND METHOD FOR REPLACING A DATA ENTRY IN A CACHE MEMORY

[76] Inventor: Jeffrey E. Trull, 3501 S. Stover St., #272, Ft. Collins, Colo. 80525

[21] Appl. No.: 206,245

[22] Filed: Mar. 7, 1994

Related U.S. Application Data

[63] Continuation of Ser. No. 726,619, Jul. 8, 1991, abandoned.

[51] Int. Cl.$^6$ .................................................. G06F 12/12
[52] U.S. Cl. ...................... 395/460; 395/461; 395/463; 395/471; 364/DIG. 1
[58] Field of Search ..................... 364/200, 900, 364/DIG. 1; 395/425, 461, 460, 463, 471

[56] References Cited

U.S. PATENT DOCUMENTS

| | | | |
|---|---|---|---|
| 4,731,739 | 3/1988 | Woffinden et al. | 395/250 |
| 4,885,680 | 12/1989 | Anthony et al. | 395/471 |
| 5,134,696 | 7/1992 | Brown et al. | 395/403 |

OTHER PUBLICATIONS

Forsyth, et al., "CMOS PA-RISC Processor for a New Family of Workstations," IEEE COMPCON Spring '91 Digest of Papers. Feb. 1991, pp. 1–3.
*The Computer Glossary: The Complete Illustrated Desk Reference*, The Computer Language Company Inc. 1991, pp. 635, 636.

Primary Examiner—Tod R. Swann
Assistant Examiner—James Peikari

[57] ABSTRACT

A method and apparatus called a cache insertion selector for selecting a slot of a memory cache in which to insert data. The access history of a slot is monitored with a single boolean variable called "used recently". A slot is marked as "used recently" when it is accessed. When a new entry is to be inserted, the cache insertion selector of the present invention attempts to select a slot which is not marked as "used recently". If all slots are marked as used recently, the cache insertion selector marks all slots as not used recently and selects one slot. A slot can be specified for unconditional selection. Also, a slot can be precluded from being selected.

13 Claims, 6 Drawing Sheets

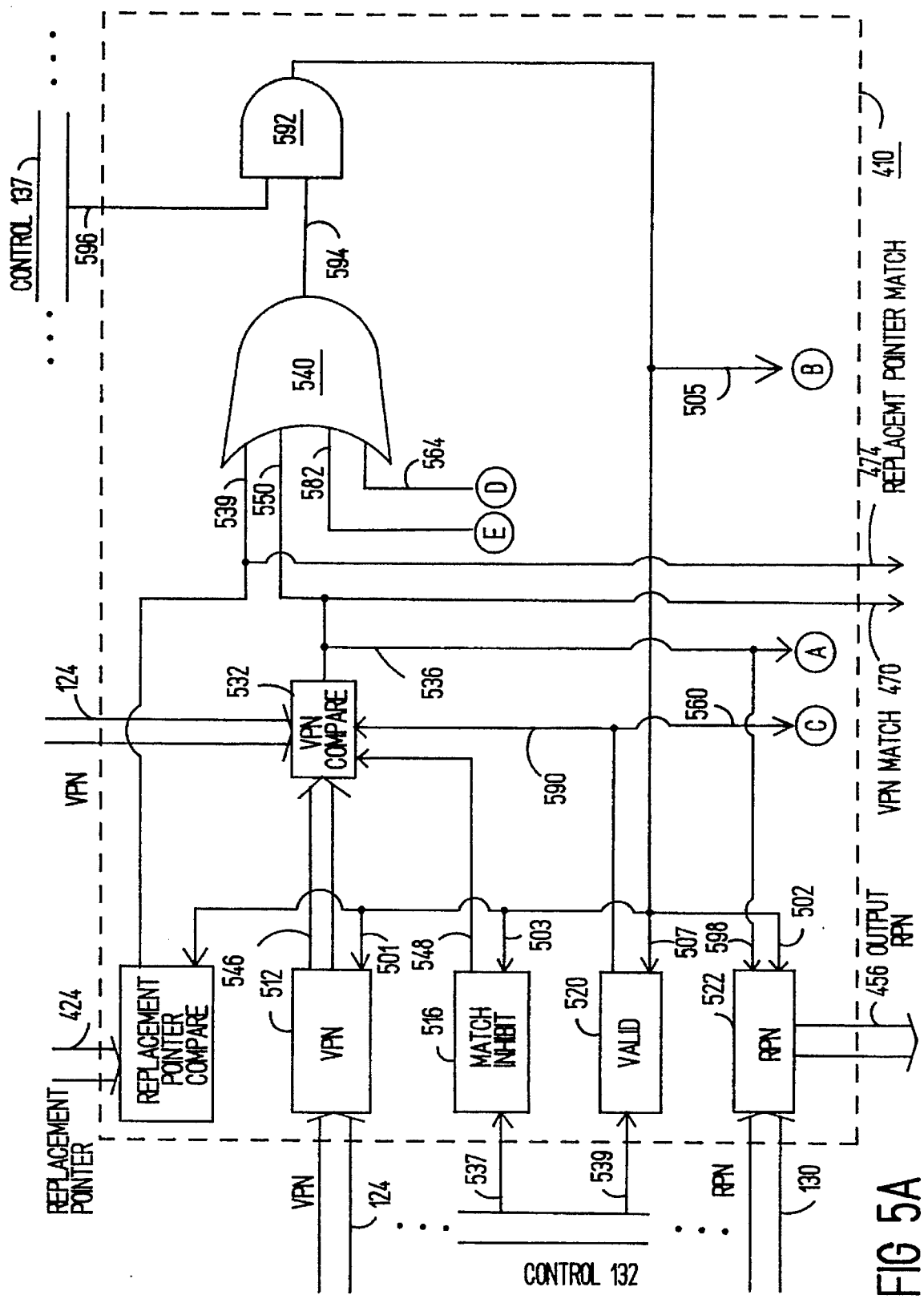

SYSTEM AND METHOD FOR REPLACING A DATA ENTRY IN A CACHE MEMORY

This is a continuation of application Ser. No. 07/726,619 filed on Jul. 8, 1991, now abandonded.

BACKGROUND OF THE INVENTION

1. Field of the Invention

The present invention relates generally to a cache memory and, more particularly, to a method and apparatus for retaining the most frequently used data in a cache memory.

2. Related Art

Computers often use cache memories to improve performance. A cache memory (called a cache) is a high-speed memory which stores frequently used data. Upon a request for a unit of data (called an entry), the CPU determines whether the entry is in the cache. If so, the CPU retrieves it from the cache and thereby avoids retrieving it from a larger, slower memory (called a primary memory) such as RAM or a disk.

An entry is retrieved through a cache as follows. An entry is requested with a portion of the entry called a key. The cache is then searched for an entry with the key. If such an entry is found, the cache returns the entry, and primary memory need not be accessed. Otherwise, the entry is copied to the cache from the primary memory. Because the cache contains a relatively small amount of memory, it fills up quickly. Copying an entry to the cache therefore generally requires replacing another entry. To maximize performance, entries which are not being frequently used should be selected for replacement.

Cache memories employ various well-known approaches for selecting a slot into which a new entry can be inserted. A first such technique is the "round robin" approach. According to the round robin approach, each time an entry is inserted to the cache, it is inserted into a slot following the slot where an entry was last inserted, or into the first slot if an entry was last inserted into the last slot. A slot is a portion of the cache which stores a single entry.

Implementation of the round robin approach is straightforward. It does not require complex circuitry or an abundance of area on the chip containing the cache. However, the round robin approach does not keep track of the access history of data entries. As a result, it selects for replacement entries which are being used frequently. Performance of a cache implementing the round robin approach suffers accordingly.

A second approach for selecting a slot into which a new entry can be inserted is the "least recently used" (LRU) approach. According to LRU approach, each time an entry is inserted into the cache, it is inserted into the slot containing the entry which was accessed least recently. On a chip implementing a cache, area is frequently at a premium. This is especially so on a chip implementing a type of cache known as a translation lookaside buffer (TLB), which is discussed in detail below.

A cache implementing LRU approach has a superior ability to determine the entries which are being frequently used. However, implementation of LRU approach generally requires bus communication between slots and memory for a pointer associated with each slot. Accordingly, this implementation requires substantial area on the chip containing the cache.

Therefore, what is needed is a cache slot selecting apparatus and method which does not require an abundance of area when implemented in hardware and which generally selects slots for replacement which are not being frequently used.

SUMMARY OF THE INVENTION

Accordingly, the present invention is directed to an apparatus and method called a cache insertion selector for accurately determining which entries of a cache are being frequently used without requiring excessive memory or complex logic.

The cache insertion selector of the present invention monitors the access history of a slot with a single boolean variable called "used recently". A slot is marked as user recently when it is accessed. When a new entry is to be inserted into the cache when all slots contain valid entries, the cache insertion selector attempts to select a slot which is not marked as user recently. If there is no such slot, the cache insertion selector marks all slots as not used recently, and selects one such slot.

The access history monitoring technique of the present invention determines which entries are being frequently used nearly as accurately as LRU approach. Accordingly, a cache implementing the cache insertion selector of the present invention achieves very high performance.

Monitoring access history of a slot by setting, checking and clearing a single boolean variable requires little memory or logic. Accordingly, implementation of the present invention requires a small amount of area on a chip.

BRIEF DESCRIPTION OF THE DRAWINGS

The present invention will be more fully understood with reference to the accompanying drawings in which:

FIGS. 5A and 5B collectively show a block diagram of a slot of the TLB of FIG. 2.

DETAILED DESCRIPTION OF THE PREFERRED EMBODIMENT

The present invention is directed towards a method and apparatus called a cache replacement selector for determining the slot of a cache in which to insert a new entry. The cache replacement selector of the present invention operates essentially as follows. A slot of a cache is marked as "used recently" when an entry in the slot is accessed. To determine the slot in which to insert a new entry, the cache replacement selector determines whether there is a slot which does not contain a valid entry. If so, the new entry is inserted in it. Otherwise, the cache replacement selector determines whether any slot is marked as not used recently. If so, the new entry is inserted in that slot. If there is no such slot, all slots are marked as not used recently, and the new entry is inserted into one such slot.

To provide a more detailed explanation of the invention, the following discussion focuses on an embodiment of the cache replacement selector of the present invention in an example of a cache known as a translation lookaside buffer (TLB). The invention, however, could be implemented in any cache.

An example of an overall system which incorporates the embodiment of the present invention in a TLB is generally described in an article by M. Forsyth et al. titled, "CMOS PA-RISC Processor For a New Family of Workstations," IEEE COMPCOM Spring '91 Digest of papers, February 1991. The environment described in this article is only one of many computer systems in which the present invention could be used. The Forsyth article is incorporated herein by reference as if set forth below in full.

A TLB is used on a computer with virtual memory. Virtual memory is explained in detail on pages 635–636 of The Computer Glossary (by Alan Freedman, American Management Association, Fifth Edition, 1991), which is hereby incorporated by reference. Essentially, virtual memory is a technique that simulates more memory than actually exists and allows the computer to run several programs concurrently regardless of their size.

Figure 1:
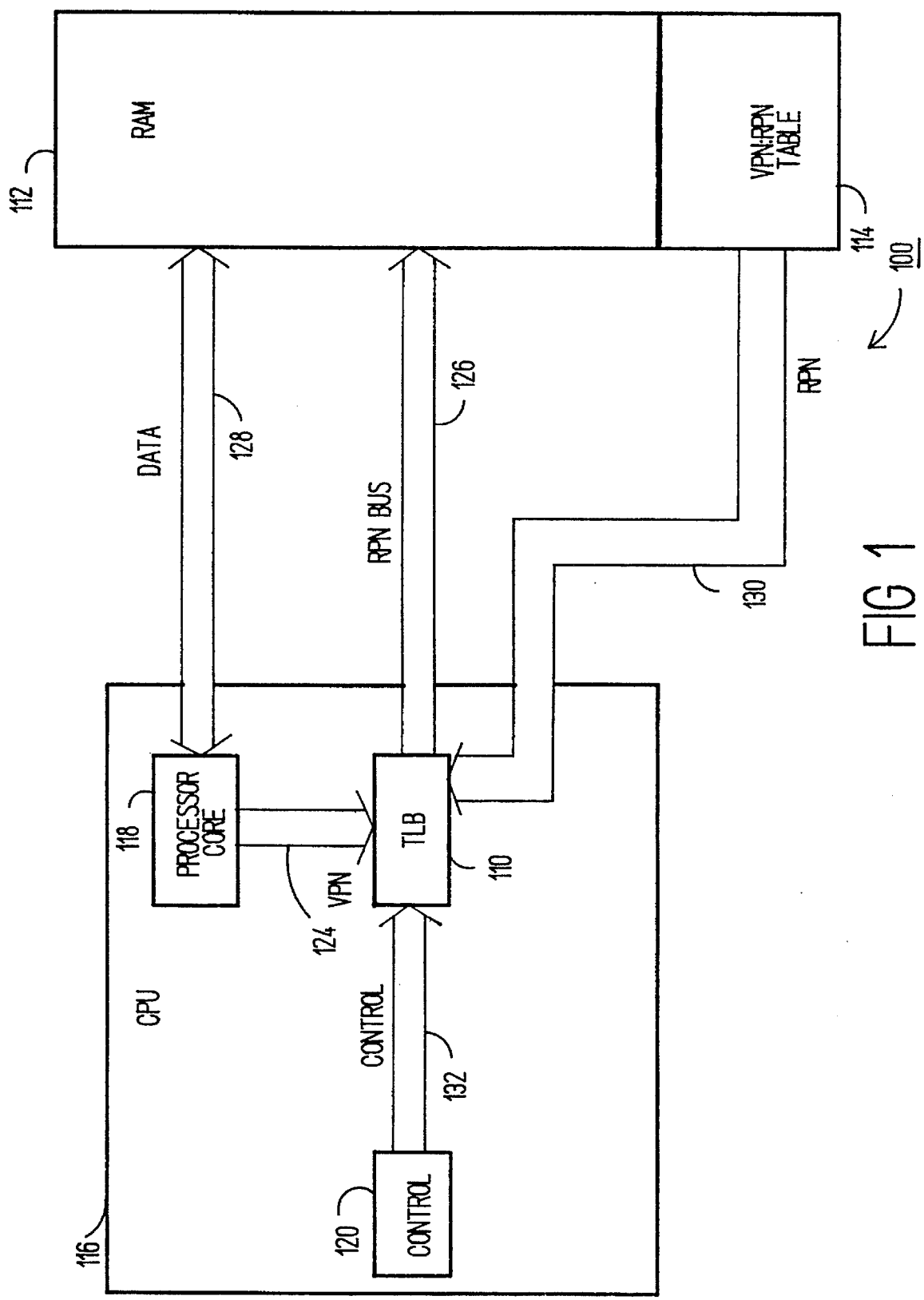
FIG. 1 shows a block diagram of the structure of a computer with virtual memory which accesses random access memory through a TLB.

FIG. 1 shows a block diagram of the structure of a computer 100 with virtual memory which accesses random access memory (RAM) through a TLB. The computer 100 has a CPU 116 and a random access memory (RAM) 112. The CPU 116 has a TLB 110, a processor core 118 and a control block 120. The RAM 112 contains a VPN:RPN table 114. In FIG. 1, the TLB is the cache, the RAM 112 is the primary memory, an element of the VPN:RPN table 114 is the entry, and a virtual page number (VPN) is the key.

The processor core 118 is a component of the CPU 116 which performs calculations and stores results. It includes, for example, an arithmetic logic unit and registers, and it comprises the main CPU pipeline. The processor core runs processes which requests memory in the RAM 112.

Memory in the RAM 112 is divided into blocks called pages. Processes running on the computer 100 request access to memory with a VPN and an offset. Memory is accessed with a real page number (RPN) and the offset. The offset specifies the specific portion of the page requested. To access memory in the RAM 112, the processor core 118 sends the requested VPN via a VPN path 124 to the TLB 110. If the TLB 110 has an entry with the requested VPN, it consults the entry to determine the corresponding RPN. It then provides the CPU 116 with access to the page of RAM 112 indicated by the RPN by sending the RPN to the RAM via an RPN bus 126. The processor core 118 can then access the portion of memory in the page specified by the offset via the data path 128.

If, on the other hand, the TLB 110 does not have an entry with the requested VPN, the TLB 110 retrieves the RPN from the appropriate entry of the VPN:RPN table 114 via a RPN path 128 from the VPN:RPN table 114.

The control block 120 is a component of the CPU 116 which generates control signals for the various components of the CPU 116, including the TLB 110. The control block 120 controls various features of the TLB 110 via a control path 132.

Figure 2:
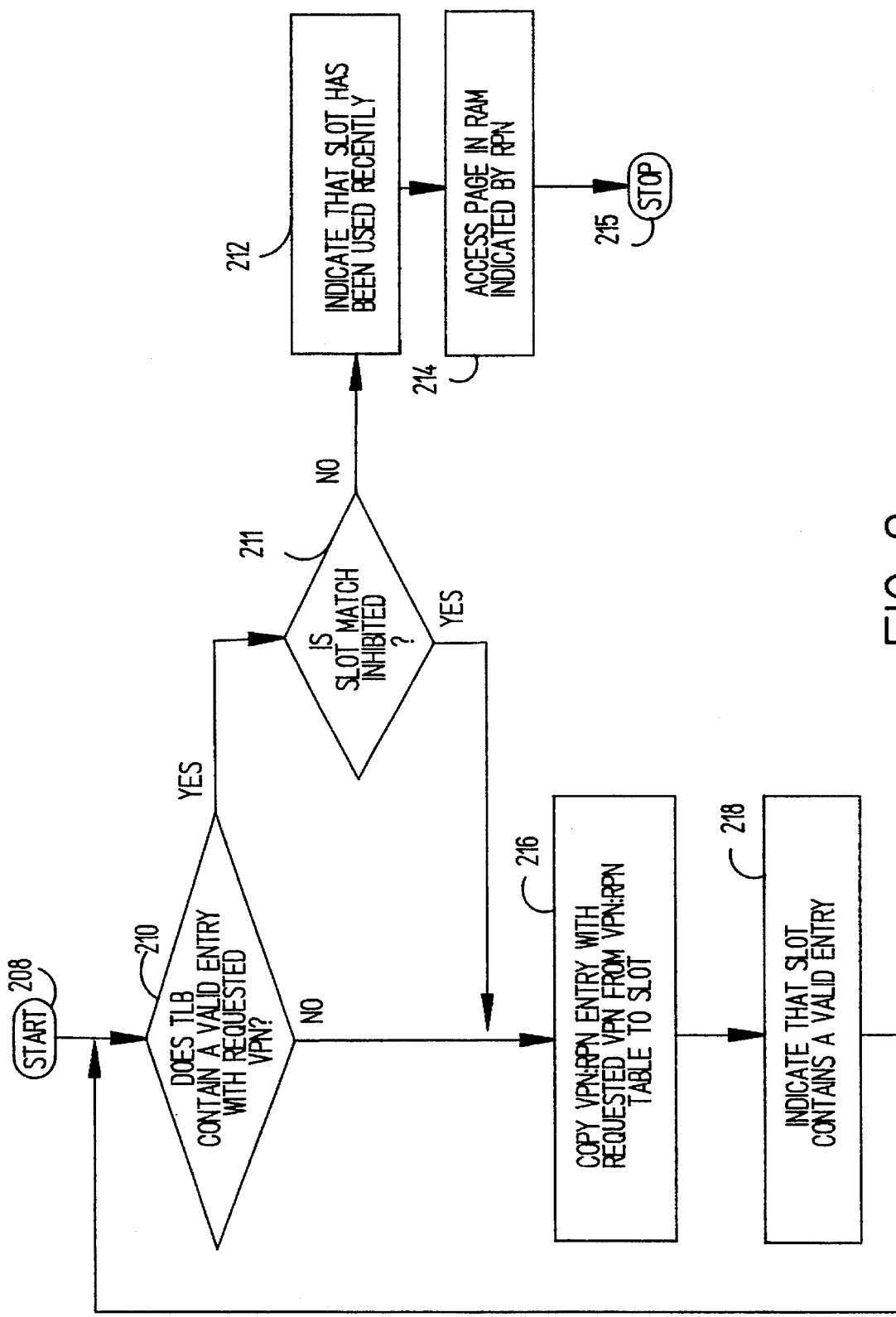
FIG. 2 shows a flow chart of a method which translates virtual page numbers to real page numbers using a TLB which implements the cache replacement selector of the present invention.

A variety of methods could be carried out on a cache which implements the cache replacement selector of the present invention. FIG. 2 shows a flow chart of one such method which translates VPNs to RPNs using a TLB 110 which implements the cache replacement selector. Looking at FIG. 2, when the method is invoked, as indicated by an oval 208, a diamond 210 is evaluated to determine whether there is a valid slot with the requested VPN. A slot is valid if it contains a valid VPN:RPN entry. If there is such a slot, a diamond 211 is evaluated to determine whether the slot has been match inhibited. Match inhibit is a feature which enables the user to preclude a slot from being selected just because its VPN matches the requested VPN. The feature could be useful in debugging, hardware testing, initialization and performance tuning.

If the slot had not been match inhibited, a block 212 is executed to mark the slot as used recently. A block 214 is then executed to access the page in RAM 112 indicated by the RPN. The method is then terminated, as indicated by an oval 215.

If, on the other hand, the slot had been match inhibited or if the TLB did not contain a valid entry with the requested VPN, a block 216 is executed to invoke the cache replacement selector of the present invention. The cache replacement selector selects a slot to replace and copies the element of the VPN:RPN table 114 with the requested VPN to that slot. Next, a block 218 is executed to indicate that the selected slot is valid. Flow of control then returns to the diamond 210, which is explained above.

A second method which uses a TLB 110 which implements the cache replacement selector of the present invention is a method for changing a real page number of a VPN:RPN entry. The second method updates the appropriate entry of the VPN:RPN table 114. It then invokes the cache replacement selector with the VPN of the entry to change. If the TLB 110 contains the original version of the VPN:RPN entry, the cache replacement selector replaces it with the updated entry from the VPN:RPN table 114. Otherwise, the cache replacement selector selects a slot and replaces the entry it contains with the updated entry from the VPN:RPN table 114. The second method then marks the slot containing the updated entry as used recently.

Figure 3:
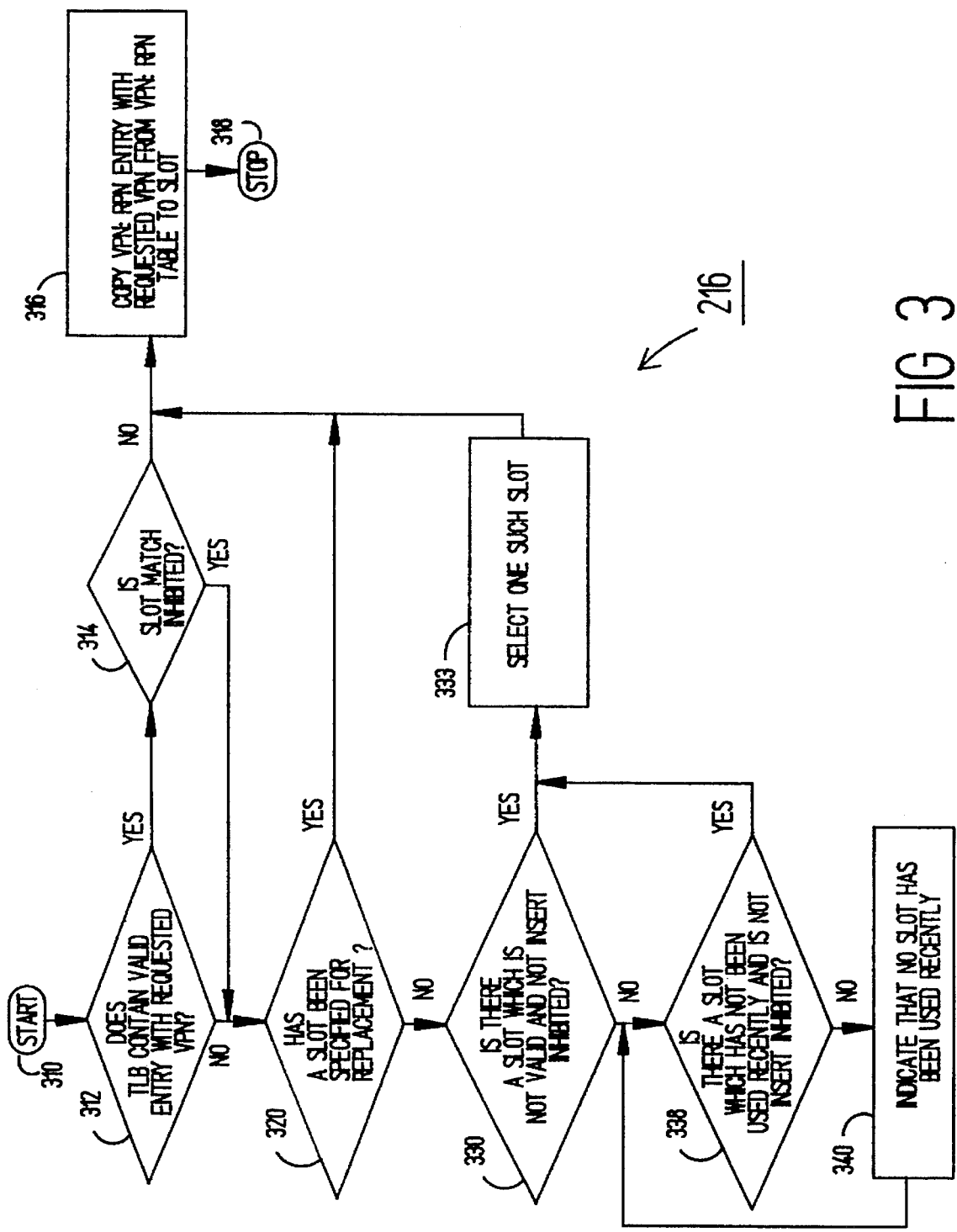
FIG. 3 shows a flow chart of the method of the cache replacement selector of the TLB of FIG. 2.

FIG. 3 shows a flow chart of the method of the cache replacement selector of the present invention when implemented in a TLB. Looking at FIG. 3, when the method is invoked, as indicated by an oval 310, a diamond 312 is evaluated to determine whether the cache contains an entry with the requested VPN. Note that there would never be such an entry if the cache replacement selector were invoked from the first method described above. If the TLB 110 contains such an entry, then a diamond 314 is evaluated to determine whether the slot containing the entry has been match inhibited.

If the slot has not been match inhibited, then a block 316 is executed to copy the element of the VPN:RPN table 114 with the requested VPN to the slot. The method then terminates, as indicated by an oval 318.

If the TLB 110 contains no entry with the requested VPN, or if the slot containing such an entry has been match inhibited, a diamond 320 is evaluated to determine whether a particular slot has been specified for replacement. Specifying a particular slot for replacement is another feature which could be useful in debugging, hardware testing, initialization and performance tuning. If such a slot has been specified, flow of control goes to the block 316, which is explained above.

Otherwise, a diamond 330 is evaluated to determine whether the TLB 110 contains a slot which does not contain a valid VPN:RPN entry and is not insert inhibited. Insert inhibit is yet another feature which could be useful in debugging, hardware testing, initialization and performance tuning. A slot which has been insert inhibited will not be selected for insertion unless its VPN matches the requested VPN or unless it was specified for replacement.

If there is at least one slot which does not contain a valid entry and is not insert inhibited, then a block 333 is executed to select one such slot. Flow of control then goes to the block 316, which is explained above.

If there is no such slot, a diamond 338 is evaluated to determine whether the TLB 110 contains a slot which is not marked as used recently and which is not insert inhibited. If so, flow control goes to block 316, which is explained above. Otherwise, a block 340 is executed to mark all slots as not used recently. Flow control then returns to the diamond 338, which is explained above.

Figure 4:
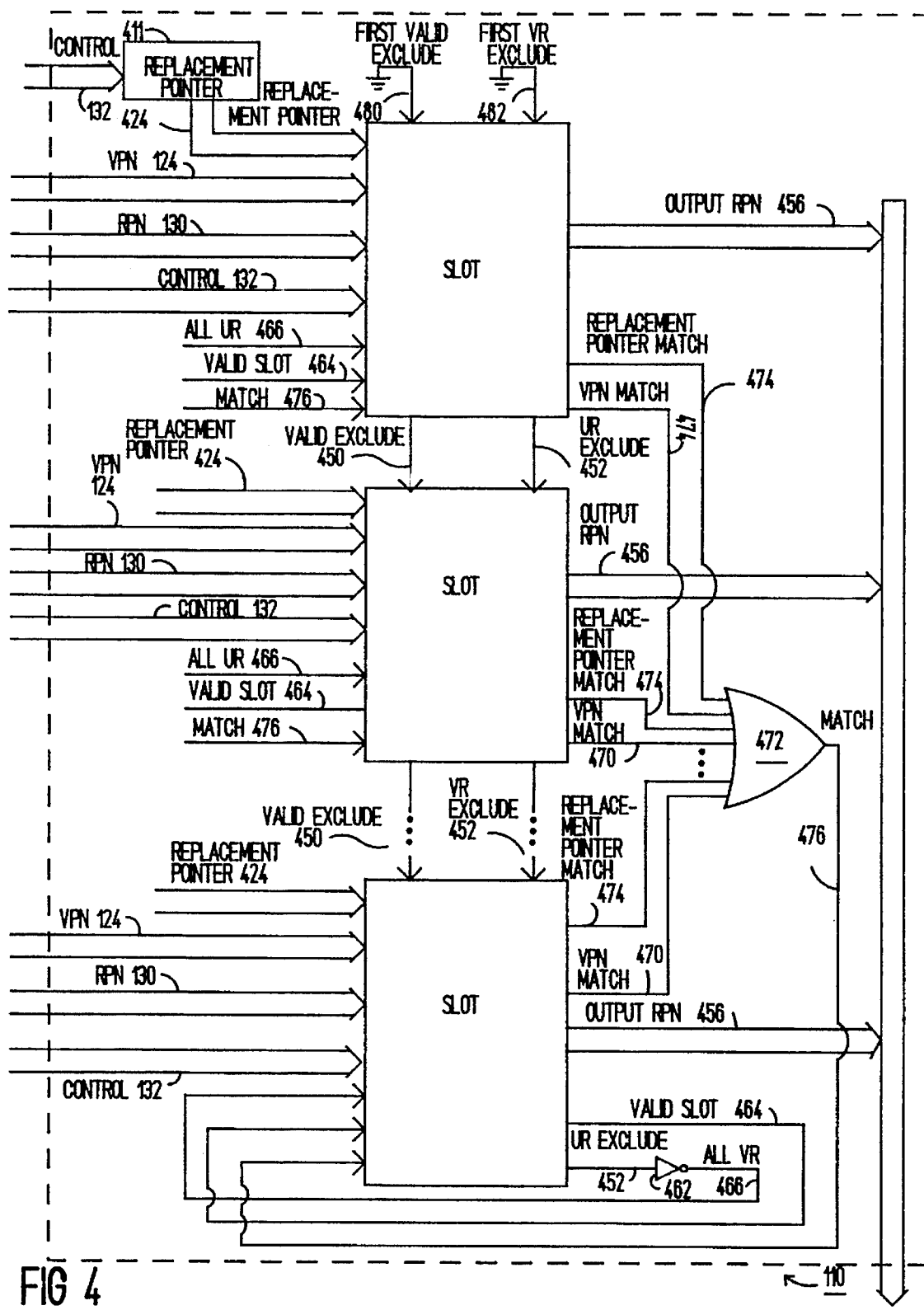
FIG. 4 shows a block diagram of the structure of the TLB of FIG. 2.

FIG. 4 shows a block diagram of the structure of a TLB 110 which implements the cache replacement selector of the present invention. The TLB 110 essentially comprises a plurality of slots 410, an AND gate 472, an invertor 462, a RPN bus 126, and a replacement pointer register 411.

The replacement pointer register 411 provides for the feature of specifying a particular slot 410 to be replaced (discussed above). The replacement pointer register 411 indicates such a slot 410 if it contains a number which identifies a slot 410. The replacement pointer register 411 is set by a signal on the control path 132. The replacement pointer register 411 is electrically connected to a first input of each slot 410 via a replacement pointer path 424.

Each slot 410 has eight additional inputs. The VPN path 124, which electrically connects the processor core 118 to a second input, indicates a requested VPN. The RPN path 130, which electrically connects the VPN:RPN table 114 to a third input, indicates a RPN to insert. The control path 132, which electrically connects the control block 120 to a fourth input, enables input to and output from the slot 410. The control path 132 also controls the match inhibit and insert inhibit features of the slot 410.

A valid exclude path 450 generally electrically connects a fourth output of the immediately previous slot 410 to a fifth input of the slot 410. The valid exclude path 450 has a high signal when any previous slot 410 is neither insert inhibited nor valid. The fifth input of the first slot 410 is tied low, for example by a connection to ground, by a first valid exclude path 480.

A UR exclude path 452 generally electrically connects a fifth output of the immediately previous slot 410 to a sixth input of the slot 410. The UR exclude path 452 has a high signal if any previous slot 410 is neither insert inhibited nor marked as used recently. The sixth input of the first slot 410 is tied low, for example by a connection to ground, by a first UR exclude path 482.

An valid slot path 464 electrically connects a fourth output of the last slot 410 to a seventh input of each slot 410. A high signal on the valid slot path 428 indicates that there is at least one slot 410 which is valid and not insert inhibited.

An all UR path 466 electrically connects an output of the invertor 466 to an eighth input of each slot 410. A high signal on the all UR path 466 indicates that all slots 410 which are not insert inhibited are marked as recently used.

A match path 476 electrically connects an output of the OR gate 472 to a ninth input of each slot 410. The signal on the match path 472 is high when any slot 410 either contains a valid entry with the requested VPN or is specified by the replacement pointer 411.

Each slot 410 has five outputs. A first output is electrically connected to the RPN bus 126 via an output RPN path 456.

A second output is electrically connected to an input to the OR gate 472 via a VPN match path 470. The second output is high when the slot 410 contains a valid entry with the requested VPN. A third output is electrically connected to an input to the OR gate 472 via a replacement pointer match path 474. (The OR gate 472 is also known as a match selected means.) The third output is high when the number of the slot 410 matches the number in the replacement register 411. As stated, the match path 476 electrically connects the output of the OR gate 472 to the ninth input of each slot 410.

The fourth output of the slot 410 is generally connected to the fifth input of the previous slot 410 via the valid exclude path 450 discussed above. However, in the case of the last slot 410, the fourth output is connected to the fourth input of each slot via the valid slot path 464.

The fifth output of the slot 410 is generally connected to the sixth input of the previous slot 410 via the UR exclude path 452 discussed above. However, in the case of the last slot 410, the UR exclude path 450 connects the fifth output to an input of the invertor 462 (also known as a UR clearing means). The all UR path 466, described above, electrically connects the output of the invertor 462 to the eighth input of each slot 410.

Alternate logic to implement the TLB 110 would be obvious to one of ordinary skill in the art.

Figure 5B:
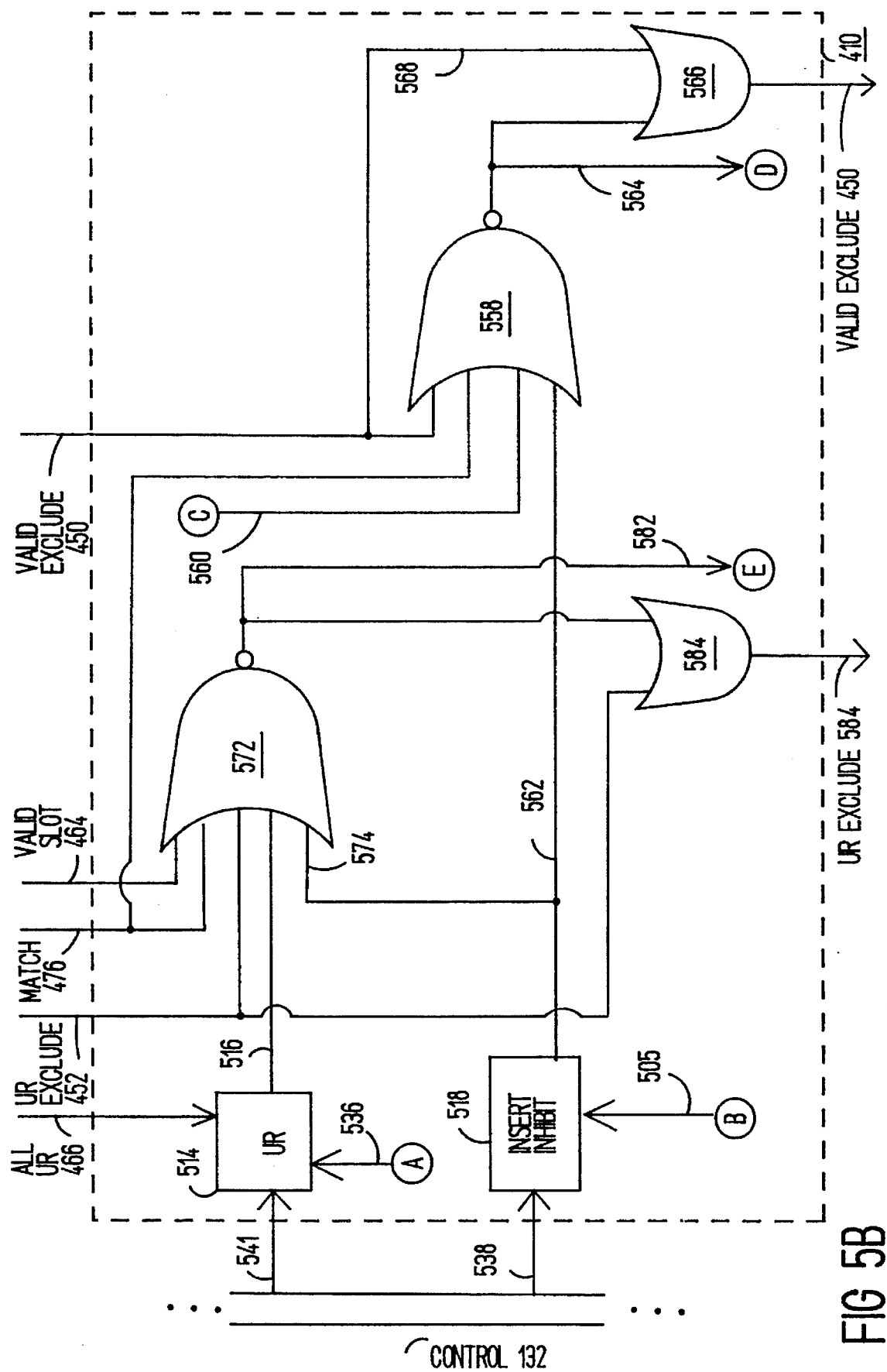

FIGS. 5A and 5B collectively show a block diagram of the structure of the slot 410. The slot 410 has a six memory registers: a VPN register 512, a UR register 514, a match inhibit register 516, an insert inhibit register 518, a valid register 520 and a RPN register 522. The VPN register 512 and the RPN register 522 store the VPN:RPN entry of the slot 410. The UR register 514 (also known as a UR setting means) provides a bit which is set when the slot 410 has been marked as used recently. The match inhibit register 516 provides a bit which is set when the slot 410 has been match inhibited. The insert inhibit register 518 provides a bit which is set when the slot 410 has been insert inhibited. The valid register 520 provides a bit which is set when the slot 410 has a valid VPN:RPN entry.

Additionally, the slot 410 includes two logic blocks: a replacement pointer compare block 524 and a VPN compare block 532. The replacement pointer compare block 524 provides an output which is high when the number in the replacement pointer register 411 is the number of the slot 410. The VPN compare block 532 provides an output which indicates whether or not the VPN in the VPN register 512 of the slot 412 matches the requested VPN.

The slot 410 operates essentially as follows. An OR gate 540 receives input from a VPN compare block 532 (via a path 550), a replacement pointer compare block 524 (via a path 539), a NOR gate 558 (via a path 564), and an AND gate 578 (via a path 582). The slot 410 is selected for insertion if the output of the OR gate 550 is high.

The detailed operation of the slot 410 is as follows. There are four ways the slot 410 could be selected for insertion, corresponding to the results of the diamonds 312 and 314, 320, 330 and 338 of FIG. 3.

The VPN compare block 532 (also known as a key compare means) implements the evaluation of the diamonds 312 and 314. The VPN compare block 532 receives input from the VPN path 124, the VPN register (via a path 546), the match inhibit register 516 (via a path 548), and the valid register 512 (via a path 590). If the VPN on the VPN path 124 (the requested VPN) equals the VPN in the VPN register 512, the valid bit is set, and the match inhibit bit is zero, the VPN compare block 532 places a high signal on the path 550. Accordingly, the slot 410 is selected for insertion if the slot 410 contains the requested VPN, is valid, and is not match inhibited.

The replacement pointer compare block 524 (also known as a replacement register compare means) implements the evaluation of the diamond 320. The replacement pointer compare 524 receives input from the replacement pointer 411 of FIG. 4 (via the replacement pointer path 424). If the slot number in the replacement pointer register 411 matches the number of the slot 410, the replacement pointer compare block 524 places a high output signal on the path 539, thereby selecting the slot 410 for insertion. The replacement pointer compare block 524 could be, for example, a hard-wired decoder.

The NOR gate 558 (also known as a nonvalid selecting means) implements the evaluation of the diamond 330 and the execution of the block 333 of FIG. 3. The NOR gate 558 receives input from (1) the valid register 520 (via a path 560), (2) the insert inhibit register 518 (via a path 562), (3) the valid exclude path 450, and (4) the match path 476. The output of the NOR gate 558 is high when the four inputs are low. The four inputs are low if (1) the valid bit is zero, (2) the insert inhibit bit is zero, (3) the signal on the valid exclude path 450 is low, and (4) the signal on the match path 476 is low. Accordingly, the slot 410 is selected if (1) the slot does not contain a valid entry, (2) the slot 410 is not insert inhibited, (3) no previous slot which is not insert inhibited does not contain a valid entry, and (4) no slot has an entry with the requested VPN, and the replacement pointer register 411 does not indicate a slot.

The NOR gate 572 (also known as a not-UR selecting means) implements the evaluation of the diamond 338 and the execution of the block 333 of FIG. 3. The NOR gate 572 receives input from (1) the insert inhibit register 518 (via a path 574), (2) the UR register 514 (via a path 576), (3) the UR exclude path 452, (4) the match path 476, and (5) the valid slot path 464. The output of the NOR gate 572 is high when the five inputs are low. The five inputs are low when (1) the insert inhibit bit is not set, (2) the UR bit is not set, (3) the signal on the UR exclude path 452 is low, (4) the signal on the match path 476 is low, and (5) the signal on the valid slot path 464 is low. Accordingly, the slot 410 is selected if (1) the slot is not insert inhibited, (2) the slot is not marked as used recently, (3) no previous slot which is not insert inhibited is not marked as used recently, (4) no slot has an entry with the requested VPN, and the replacement pointer register 411 does not indicate a slot, and (5) no slot which is not insert inhibited is not valid.

The AND gate 592 implements the execution of the block 316 of FIG. 3. The AND gate 592 receives input from the OR gate 540 (via a path 594) and the control path 132 (via a path 596). The signal on the control path 132 pulses high once each slot 410 has determined whether it is selected for insertion. Accordingly, if the slot 410 determines that it is selected for insertion, the AND gate 592 sends a high pulse to an input enable of the VPN register 512 (via a path 501) and to an input enable of the RPN register 522 (via a path 502).

Upon receiving a high signal on its input enable, the VPN register 512 is overwritten by the VPN on the VPN path 124. Similarly, the RPN register 522 is overwritten by the RPN on the RPN path 130 upon receiving a high signal at its input enable.

The output of the AND gate 592 is also electrically connected to an input enable of the match inhibit register 516 (via a path 503), an input enable of the insert inhibit register 518 (via a path 505), and an input enable of the valid register 520 (via a path 507). Upon receiving a high signal at their input enables, the contents of each of these registers is overwritten by the signal on the control path 132. Thus, whether or not the slot 410 is match inhibited, insert inhibited, and marked as valid can be changed when the slot 410 is selected.

The block 212 of FIG. 2 is implemented as follows. The UR register 514 has a setting input which marks the slot 410 as used recently when it receives a high signal. The setting input is electrically connected to the output of the VPN compare block 532 (via a path 536). Thus, the slot 410 is marked as used recently when the VPN of the slot 410 matches the requested VPN.

The block 340 of FIG. 3 is implemented as follows. The UR register 514 has a clearing input which marks the slot 410 as not used recently when it receives a high signal. The clearing input is electrically connected to the all UR path 466. Thus, the slot 410, as well as all of the other slots 410, is marked as not used recently when all slots 410 which are not insert inhibited are marked as used recently.

The RPN register 522 places an RPN on the output RPN path when there is a high signal at its output enable. The output enable is electrically connected to the output of the VPN compare block 532 via a path 598. The RPN is placed on the RPN path when the slot 410 contains the requested VPN, thus providing for the execution of the block 214 of FIG. 2.

The signal on the valid exclude path 450 is generated as follows. An OR gate 566 (also known as a nonvalid selected means) receives input from the output of the NOR gate 558 (via a path 568) and from the input valid exclude path 450. The output valid exclude path 450 is electrically connected to the output of the OR gate 566 and is therefore high whenever either the slot 410 or a previous slot neither contains a valid entry nor is insert inhibited.

The signal on the UR exclude path 452 is generated as follows. An OR gate 584 receives input from the output of the NOR gate 572 (via a path 586) and from the input UR exclude path 452. The output UR exclude path 452 is electrically connected to the output of the OR gate 584 and is therefore high whenever either the slot 410 or a previous slot is neither marked as used recently nor insert inhibited.

The VPN match path 470 of FIG. 4 is electrically connected to the output of the VPN compare block 532.

The replacement pointer match path 474 of FIG. 4 is electrically connected to the output of the replacement pointer compare block 524.

Alternate logic to implement the slot 410 would be obvious to one of ordinary skill in the art.

While the invention has been particularly shown and described with reference to preferred embodiment thereof, it will be understood by those skilled in the art that changes in form and details may be made therein without departing from the spirit and scope of the invention.

What is claimed is:

1. In a system having a cache memory that provides access to frequently used data by storing the data in slots, a method for selecting one of said slots in which to insert a new data entry, comprising the steps of:

(1) designating one of said slots;

(2) determining whether said designated slot is marked as "used recently," wherein a particular slot is marked as "used recently" when an entry in said particular slot is accessed by a requesting device;

(3) selecting said designated slot if it is not marked as "used recently," and inserting said new data entry into said designated slot if it is selected;

(4) repeating steps (1)–(3) until either all of said slots have been designated by step (1) or until a slot has been selected by step (3); and (5) marking all of the slots in the cache memory as "not used recently" if no slot was selected.

2. The method of claim 1, wherein steps (1)–(3) are repeated after carrying our step (5).

3. The method of claim 1, further comprising steps of:

(7) designating one of said slots;

(8) determining whether said designated slot contains a valid entry;

(9) selecting said designated slot if it does not contain a valid entry; and

(10) performing steps (7)–(9) until either all said slots have been designated by step (7) or until a slot has been selected by step (9).

4. The method of claim 3, further comprising steps of:

(11) designating one of said slots;

(12) determining whether a key of said designated slot matches a requested key;

(13) selecting said designated slot if said key of said designated slot matches said requested key; and

(14) performing steps (11)–(13) until either all said slots have been designated by step (11) or until a slot has been selected by step (13).

5. The method of claim 4 further comprising the step of inhibiting steps (1)–(4) if one of said slots was selected by the step (9) or by the step (13).

6. The method of claim 4, further comprising the step of inhibiting steps (7)–(10) if one of said slots was selected by the step (13).

7. The method of claim 4, further comprising the step of enabling a user to inhibit a specified slot from being selected by the step (13).

8. The method of claim 3, further comprising the step of enabling a user to inhibit a specified slot from being selected by the steps (3) and (9).

9. The method of claim 1, further comprising the step of selecting one of said slots if it has been previously identified for selection.

10. The method of claim 1, wherein steps (1)–(5) are carried out by a translation lookaside buffer.

11. In a system having a memory device which stores frequently used data in a plurality of memory locations, a system for replacing a data entry in the memory device, comprising:

first means for setting a "used recently" bit associated with one of the memory locations in the memory device when the memory location is accessed by a requesting device;

second means for evaluating the contents of the memory device to determine whether the memory device has any memory locations whose associated "used recently" bits have not been set;

third means, responsive to said second means, for inserting data into one of the memory locations whose associated "used recently" bit has not been set; and fourth means, responsive to said second means, for clearing all of said "used recently" bits if said second means determines that the "used recently" bit associated with each of the plurality of memory locations has been set.

12. The system of claim 11, further comprising means for inserting data into one of the memory locations if the memory location does not have valid data contained therein.

13. In a system having a first memory device which stores frequently used data in a plurality of memory locations and a second memory device, a method for retaining the most recently used data in the first memory device, the method comprising the steps of:

(1) requesting a unit of data, comprising the steps of,
  (a) determining if said unit of data is resident in the first memory device;
  (b) marking the memory location storing said unit of data as "used recently" if said unit of data is resident in said first memory device; and
  (c) initiating a replacement routine if said unit of data is not resident in said first memory device, said replacement routine including retrieving said unit of data from the second memory device wherein said replacement routine further includes replacing the contents of one of the memory locations within said first memory device with said unit of data retrieved from said second memory device, comprising the steps of,
  (i) checking a designated memory location within said first memory device to determine if it has been marked as "used recently";
  (ii) replacing said designated memory location with said retrieved unit of data from said second memory device if said designated memory location has not been marked as "used recently";
  (iii) repeating steps (i) and (ii) for a different memory location until either said retrieved unit of data is stored in said first memory device or all of said different memory locations have been checked; and
  (iv) marking all memory locations within said first memory as "not recently used" if all of said memory locations are marked as "used recently", and repeating steps (i) and (ii).

* * * * *